3,147,070
HYDROXYLAMINE COORDINATION COMPOUNDS

Douglas A. Rausch, Midland, Mich., assignor to The Dow Chemical Company, Midland, Mich., a corporation of Delaware
No Drawing. Filed July 1, 1960, Ser. No. 40,473
2 Claims. (Cl. 23—14)

This invention pertains to novel hydroxylamine coordination compounds, and more particularly, to lithium perchlorate-hydroxylamine and magnesium perchlorate-hydroxylamine coordination products.

Hydroxylamine is a solid and theoretically should be an excellent oxidant for metallic fuels, such as aluminum, magnesium, beryllium, and mixtures thereof in propellants. However, the instability of the compound has limited its use as an oxidant. It would be greatly desirable to obtain a solid oxidant incorporating hydroxylamine which would be stable and could be used in solid propellants.

It is therefore an object of this invention to provide new compounds which may be used as solid oxidants. A further object is to provide a solid oxidant incorporating hydroxylamine. Another object is to provide a propellant using the new compounds as oxidants.

The above and other objects are attained according to the invention by the novel compositions which are coordination compounds of hydroxylamine and lithium perchlorate and hydroxylamine and magnesium perchlorate. The lithium perchlorate-hydroxylamine coordination product has a ratio of 2 moles of hydroxylamine per mole of lithium perchlorate. It is a white solid which melts with decomposition at 100° C. The magnesium perchlorate-hydroxylamine coordination product has 4 moles of hydroxylamine per mole of magnesium perchlorate. It is also a white solid and decomposes at about 155° C. When these complexes are intermixed with metallic fuels they serve as oxidants and upon oxidation of the fuel provide gaseous products which aid in increasing the specific impulse of the fuel.

These compounds may be prepared by the reaction of the respective perchlorate with hydroxylamine under anhydrous conditions in an inert solvent. Since hydroxylamine is relatively unstable, a solution of hydroxylamine in a lower aliphatic alcohol having up to 4 carbon, such as methyl, ethyl, or butyl alcohols, is generally used and the reaction carried out in the solution with the alcohol serving as the reaction medium. The perchlorate is simply added to the alcohol solution of the hydroxylamine to react the perchlorate with the hydroxylamine to obtain the complex product. The complex product obtained is soluble in the reaction diluent and may be recovered from the reaction mixture by vacuum distillation, solvent extraction, or other methods. The most convenient method is to "salt out" the desired product by adding to the reaction mixture a low boiling second solvent which is miscible with the alcohol and in which the complex product is insoluble. For example, the addition to the reaction mixture of a low boiling non-polar organic solvent, such as butane, pentane and chloroform, or an alkyl ether having alkyl substituents of from 1 to 4 carbon atoms will result in the precipitation of the desired product. Cooling the reaction mixture will also improve the crystallization. At times it may be desirable to dissolve the perchlorate in an alkyl ether prior to adding the perchlorate to the hydroxylamine solution. With the addition of the solution of the perchlorate to the alcohol solution of the hydroxylamine, crystallization of the complex occurs. The recovery of the product generally can be further increased by the addition of more ether or some other miscible organic solvent. A product thus obtained may be filtered, washed, and dried under vacuum.

The reaction of the hydroxylamine with the perchlorate is generally carried out at room temperature. A temperature above room temperature may be used but no beneficial advantage is obtained. In case of the lithium perchlorate-hydroxylamine coordination compound, a reaction temperature over 50° C. is seldom used. Even though the product will not decompose rapidly until its melting point of about 100° C., some decomposition of the product may be obtained at temperatures above 50° C. For the magnesium perchlorate-hydroxylamine product, a temperature up to the boiling point of the solvent or up to 150° C. may be used. A lower reaction temperature may also be used but no specific advantage is gained. However, if the method of recovering the desired product from the reaction mixture is by means of crystallization, cooling the reaction mixture to a temperature of about 0 to 10° C. decreases the solubility of the product. Thus, a higher yield may be obtained. Also the filterability of the compound is improved by maintaining the reaction mixture at the lower temperatures for from 1 to 2 hours to allow for crystal growth. In the reaction anhydrous reactants and solvents must be used. If even small amounts of water are present, a perchlorate hydrate type product is obtained.

Generally, the hydroxylamine coordination product crystallized from the reaction mixture by the addition of a second solvent is of sufficient purity for most uses. However, the product may be further purified by recrystallization or by selective dissolution. The magnesium perchlorate-hydroxylamine complex obtained generally contains a small residue of magnesium oxide and may be most conveniently purified by using a solvent which will dissolve the complex but not the magnesium oxide. After the complex is dissolved, the resulting solution may be evaporated to obtain the complex. The lower aliphatic alcohols may be used as solvents to preferentially dissolve the complex.

The following examples illustrate the preparation of the novel compounds.

Example I

A solution of hydroxylamine was prepared by reacting sodium ethoxide with hydroxylamine hydrochloride in ethyl alcohol and filtering off the precipitated sodium chloride. To 40 milliliters of the hydroxylamine-ethyl alcohol solution containing 0.66 gram of hydroxylamine per milliliter, 4.24 grams of anhydrous lithium chlorate dissolved in 50 milliliters of anhydrous ethyl ether were added while the mixture was being stirred. Some precipitation of the complex was obtained. After the addition of the lithium perchlorate, isopentane was added to increase the crystallization of the desired product. The isopentane was added in an amount to saturate the solution without the formation of a second immiscible phase. The precipitate obtained was filtered, washed with ethyl ether, and dried under vacuum to give about 3 grams. The product obtained was a white solid and had an analysis of 3.7 weight percent of lithium and 19.8 weight percent of chlorine. This compared to a theoretical analysis of 4.1 weight percent of lithium and 20.1 weight percent chlorine for a compound having the formula $LiClO_4 \cdot 2(NH_2OH)$. Infrared analysis indicated the presence of the hydroxylamine molecule and X-ray diffraction showed a new pattern.

Example II

The magnesium perchlorate-hydroxylamine coordination product was prepared using 40 milliliters of hydroxylamine-ethyl alcohol solution prepared in a manner similar to that described in Example I. The hydroxylamine-ethyl alcohol solution contained about 0.66 gram of hydroxylamine per milliliter. To this solution were added 4.46 grams of anhydrous magnesium perchlorate. After intermixing the magnesium perchlorate, approximately 125 milliliters of anhydrous ethyl ether was added which had a salting out effect and resulted in the precipitation of a precipitate. The precipitate was recovered from the reaction mixture by filtration and purified by dissolving the magnesium perchlorate-hydroxylamine complex in methyl alcohol. Approximately 200 milliliters of methyl alcohol were used for each 5 grams of reaction product. The magnesium perchlorate-hydroxylamine product dissolved in the alcohol and the undesirable precipitate was removed by filtration. The methanol filtrate obtained upon filtration was evacuated to dryness yielding a substantially pure product of magnesium perchlorate-hydroxylamine coordination compound in an amount of about 3 grams.

The product was a white solid which decomposed at about 155° C. It had an analysis of 6.4 weight percent of magnesium, 3.3 weight percent of hydrogen and 19.0 weight percent of chlorine. This compared to a theoretical analysis of 6.3 weight percent magnesium, 3.1 weight percent of hydrogen and 18.2 weight percent of chlorine of a compound having a formula of $$Mg(ClO_4)_2 \cdot 4(NH_2OH)$$

Infrared analysis indicated the presence of hydroxylamine and X-ray diffraction showed a new pattern.

When the coordination products are used as oxidants in solid propellants, they may be incorporated in the solid propellant by any of the various known methods. For example, the coordination compound can be intermixed with the fuel if the fuel is in powder or particulate form. A binder may be used, if necessary. If the fuel is in the form of a cellular element, the coordination product may be used to fill the voids. The ratio of the coordination product to the fuel used is in the range generally used in propellants. A stoichiometric or a slight excess of the oxidant is usually used.

A solid propellant made by intermixing stoichiometric amounts of the coordination product with metallic fuels, such as aluminum, magnesium and beryllium, have specific impulses as follows:

| Fuel | $MgClO_4 \cdot 4(NH_2OH)$ | $LiClO_4 \cdot 2(NH_2OH)$ |
|---|---|---|
| Aluminum | 267 | 253 |
| Mangnesium | 242 | 245 |
| Beryllium | 257 | 270 |

What is claimed is:

1. A hydroxyamine-lithium perchlorate coordination compound having a mole ratio of 2 moles of hydroxylamine per mole of lithium perchlorate.

2. A hydroxylamine-magnesium perchlorate coordination compound having a mole ratio of 4 moles of hydroxylamine per mole of magnesium perchlorate.

References Cited in the file of this patent
UNITED STATES PATENTS

| | | |
|---|---|---|
| 2,768,874 | Robson | Oct. 30, 1956 |
| 2,783,138 | Parsons | Feb. 26, 1957 |
| 2,857,258 | Thomas | Oct. 21, 1958 |
| 2,858,188 | Haller | Oct. 28, 1958 |